US008071494B2

(12) United States Patent
Nagai et al.

(10) Patent No.: US 8,071,494 B2
(45) Date of Patent: Dec. 6, 2011

(54) GLASS SUBSTRATE FOR FLAT PANEL DISPLAY, PROCESS FOR PRODUCING THE SAME, AND DISPLAY PANEL EMPLOYING THE SAME

(75) Inventors: Kensuke Nagai, Chiyoda-ku (JP); Tetsuya Nakashima, Chiyoda-ku (JP); Kei Maeda, Chiyoda-ku (JP); Ryoji Akiyama, Chiyoda-ku (JP); Akira Kondo, Chiyoda-ku (JP); Daiki Akie, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 414 days.

(21) Appl. No.: 12/437,739

(22) Filed: May 8, 2009

(65) Prior Publication Data

US 2009/0253567 A1 Oct. 8, 2009

Related U.S. Application Data

(63) Continuation of application No. PCT/JP2007/070475, filed on Oct. 19, 2007.

(30) Foreign Application Priority Data

Nov. 10, 2006 (JP) ................................ 2006-305637

(51) Int. Cl.
*C03C 3/087* (2006.01)
*C03B 18/20* (2006.01)

(52) U.S. Cl. .............. 501/69; 501/70; 65/32.1; 65/32.5; 65/99.2; 65/99.3; 65/99.4; 65/99.5; 65/99.6

(58) Field of Classification Search .................... 501/69, 501/70; 65/32.1, 32.5, 99.2–99.6
See application file for complete search history.

(56) References Cited

U.S. PATENT DOCUMENTS 5,925,583 A 7/1999 Yoshii et al.
2009/0137379 A1 5/2009 Nagai et al.

FOREIGN PATENT DOCUMENTS

JP 10152339 A 6/1998
JP 10-255669 9/1998
JP 10-334813 12/1998
JP 2004-51473 2/2004
JP 2004-189591 7/2004
JP 2006252828 A 9/2006
JP 2007523038 T 8/2007
WO WO 2005/080278 A2 9/2005

OTHER PUBLICATIONS

U.S. Appl. No. 13/163,820, filed Jun. 20, 2011, Nagai, et al.
Office Action issued Jan. 13, 2011, in Chinese Patent Application No. 200780041086.0 (with English translation).

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The present invention provides a glass substrate for flat panel display in which yellowing occurring in a case of forming silver electrodes on glass substrate surface is inhibited.

A glass substrate for flat panel display, which is formed by a float method, which has a composition consisting essentially of, in terms of oxide amount in mass %:

| | |
|---|---|
| $SiO_2$ | 50 to 72%, |
| $Al_2O_3$ | 0.15 to 15%, |
| MgO + CaO + SrO + BaO | 4 to 30%, |
| $Na_2O$ | more than 0% and at most 10%, |
| $K_2O$ | 1 to 21%, |
| $Li_2O$ | 0 to 1%, |
| $Na_2O + K_2O + Li_2O$ | 6 to 25%, |
| $ZrO_2$ | 0 to 10%, and |
| $Fe_2O_3$ | 0.0725 to 0.15%; and |

wherein the average $Fe^{2+}$ content in a surface layer of the glass substrate within a depth of 10 μm from the a top surface is at most 0.0725% in terms of $Fe_2O_3$ amount.

5 Claims, No Drawings

GLASS SUBSTRATE FOR FLAT PANEL DISPLAY, PROCESS FOR PRODUCING THE SAME, AND DISPLAY PANEL EMPLOYING THE SAME

TECHNICAL FIELD

The present invention relates to a glass substrate for flat panel display, more specifically, a glass substrate for a flat panel display such as a plasma display panel (hereinafter it is abbreviated to as PDP) wherein a silver electrode is formed on a surface of glass substrate for display, to a process for producing such a substrate, and to a display panel employing such a substrate.

BACKGROUND ART

Along the progress of electronic components in recent years, many types of flat panel displays have been developed, which include PDPs, liquid crystal display panels, electroluminescence panels, fluorescence display panels, electrochromic display panels, light emitting diode display panels and gas discharge type display panels. Among them, PDPs are attentioned as thin type and large sized flat panel type color displays. In a PDP, there are many cells formed between a front substrate used as a display surface and a rear substrate, and an image is formed by conducting plasma discharge in the cells. These cells are formed by partitioning by partition walls, and in order to control display state of each pixel forming an image, an electrode is formed in each pixel.

A PDP is constituted by a front glass panel and a rear glass panel, and the front glass panel and the rear glass panel are sealed together by a sealing material. In the front portion of the panel, the front glass plate, there are transparent electrodes, bus electrodes, transparent dielectric layer and a protection film, and in the rear portion, there are the rear glass plate, address electrodes, white dielectric layer, fluorescent layer and partition walls. Ultraviolet rays is commonly changed to visible light by a function of such a fluorescent member.

On the front glass plate of PDP, electrodes for producing plasma discharge are formed, and for these electrodes, narrow linear silver electrodes are employed for many cases. Such employment of silver electrodes causes a problem of so-called yellowing that is a problem that the front glass plate is discolored to be yellow when the electrodes are formed by baking. Namely, the discoloration of front glass plate of PDP to be yellow causes a problem that the balance of three primary colors of light is impaired. Further, there also occurs a problem that its visible light transmittance decreases. This yellowing is considered to be caused by a colloid condensation reaction in which silver ions ($Ag^+$) become $Ag^0$ by reduction of e.g. $Fe^{2+}$ or $Sn^{2+}$ present in the glass.

As measures for solving the above yellowing of front glass plate, there are known, for example, a flat panel display substrate (refer to e.g. Patent Document 1) wherein a surface on which metal electrodes are to be formed is polished to remove a reducing heterogeneous layer formed on the surface, a plasma display device (refer to e.g. Patent Document 2) wherein the amount of $Fe_2O_3$ is less than 2,000 ppm (0.2%) and metal electrodes are made of silver, and a process for producing glass substrate for image display device (refer to e.g. Patent Document 3) wherein control is made to reduce the reduction power in a float bath when the amount of $Sn^{2+}$ in a glass substrate exceeds a tolerance.

However, although the method described in Patent Document 1 is effective, it is necessary to polish produced glass plates and its cost for polishing is enormous. Further, the methods described in Patent Documents 2 and 3 are not always effective to solve the problem of yellowing.

Patent Document 1: JP-A-10-255669

Patent Document 2: JP-A-10-334813

Patent Document 3: JP-A-2004-189591

DISCLOSURE OF THE INVENTION

Problems to be Solved by the Invention

As described above, in a flat plane display substrate for e.g. PDP, when silver electrodes are formed on a substrate surface, there occurs a problem of yellowing of a glass in the vicinity of these silver electrodes. To cope with this problem, there are a few known techniques, but they have not sufficiently satisfy the industry's desire.

Accordingly, it is an object of the present invention to provide a glass substrate for flat panel display in which yellowing caused by formation of silver electrodes on a glass substrate surface is inhibited even without e.g. polishing of the glass substrate surface; a process for producing such a glass substrate; and a display panel employing such a glass substrate.

Means for Solvent the Problems

In order to achieve the above objects, the present inventors have conducted extensive studies with respect to the relation between the amount of $Fe^{2+}$ ions contained in a glass substrate and yellowing of the glass substrate, and as a result they have discovered that the content of $Fe^{2+}$ ions in the glass substrate is not always uniform but differs between portions of the glass substrate (differs depending on the depth from a top face of the glass substrate), and that the content of $Fe^{2+}$ ions in a specific portion in the glass substrate influences yellowing in a case that silver electrodes are formed.

The present invention has been made based on the above new knowledge discovered by the inventors.

Namely, the present invention provides a glass substrate for flat panel display, which is formed by a float method, which has a composition consisting essentially of, in terms of oxide amount in mass %:

| | |
|---|---|
| $SiO_2$ | 50 to 72%, |
| $Al_2O_3$ | 0.5 to 15%, |
| MgO + CaO + SrO + BaO | 4 to 30%, |
| $Na_2O$ | more than 0% and at most 10%, |
| $K_2O$ | 1 to 21%, |
| $Li_2O$ | 0 to 1%, |
| $Na_2O + K_2O + Li_2O$ | 6 to 25%, |
| $ZrO_2$ | 0 to 10%, and |
| $Fe_2O_3$ | 0.0725 to 0.15%; and |

wherein the average $Fe^{2+}$ content in a surface layer of the glass substrate within a depth of 10 μm from the top surface is at most 0.0725% in terms of $Fe_2O_3$ amount.

Further, the present invention provides a process for producing glass substrate for flat panel display, which is a process for producing the above glass substrate for flat panel display, wherein hydrogen concentration in a float bath atmosphere is at most 3 vol %.

Further, the present invention provides the process for producing glass substrate for flat panel display, which is a process for producing the above glass substrate for flat panel display, wherein a glass-staying time in the float bath is at most 15 minutes.

Further, the present invention provides a process for producing glass substrate for flat panel display, which is a process for producing the above glass substrate for flat panel display, wherein the hydrogen concentration in a float bath atmosphere is at most 3 vol %, and the glass-staying time in the float bath is at most 15 minutes.

Further, the present invention provides a flat panel display employing the glass substrate for flat panel display as defined above.

EFFECTS OF THE INVENTION

In the glass substrate for flat panel display of the present invention, yellowing caused by formation of silver electrodes on the surface of the glass substrate is inhibited to a level causing no problem in practical use, and the problem that the balance of three primary colors of light is impaired by yellowing and the problem that visible light transmittance is decreased are solved.

The glass substrate for f at panel display of the present invention maintains performances required for a glass substrate for flat panel display, particularly, a heat expansion coefficient of from $75\times10^{-7}$ to $90\times10^{-7}$/° C. and a strain point of at least 560° C. that represent moldability of glass substrate, such being preferred.

In the process for producing glass substrate for flat panel display of the present invention, without adding new processes, by making the hydrogen concentration in a float bath atmosphere to be at most 3 vol % and by making the glass staying time in the float bath to be at most 15 minutes, it is possible to make the average $Fe^{2+}$ content in a surface layer within a depth of 10 μm from the top surface of a glass substrate produced, more specifically, in a surface layer within a depth of 10 μm from a glass substrate surface on which silver electrodes are to be formed, to be at most 0.0725% in terms of $Fe_2O_3$ content. Accordingly, it is not necessary to add a new process such as a polishing process to a common process for producing glass substrate for flat panel display, and the process of the present invention is excellent in productivity of glass, energy efficiency and yield.

BEST MODE FOR CARRYING OUT THE INVENTION

Now, the present invention will be further described.

In a case of using the glass plate for flat panel display of the present invention is used as a flat panel display substrate, usually, silver electrodes are formed on a top surface of the glass substrate. The top surface means a surface on opposite side from a surface (bottom surface) of the glass substrate (actually a molten glass ribbon) in contact with a molten tin when the glass substrate is formed by a float method. If silver electrodes are formed on a bottom surface in contact with molten tin at the time of float forming, there occurs significant yellowing, such being not preferred.

A specific example of such a flat panel display may be PDPs.

The glass substrate for flat panel display of the present invention has a composition in terms of the amount of oxide in mass percentage, substantially containing:

| | |
|---|---|
| $SiO_2$ | 50 to 72%, |
| $Al_2O_3$ | 0.5 to 15%, |
| MgO + CaO + SrO + BaO | 4 to 30%, |
| $Na_2O$ | more than 0% and at most 10%, |
| $K_2O$ | 1 to 21%, |
| $Li_2O$ | 0 to 1%, |
| $Na_2O + K_2O + Li_2O$ | 6 to 25%, |
| $ZrO_2$ | 0 to 10%, and |
| $Fe_2O_3$ | 0.0725 to 0.15%. |

When the composition of the glass substrate for flat panel display is as described above, the performance of glass substrate for flat panel display, particularly, a heat expansion coefficient of from $75\times10^{-7}$ to $90\times10^{-7}$/° C. and a strain point of at least. 560° C. are maintained, and moldability required for a glass substrate can be obtained.

In the above composition, the reasons of the limitations are as follows. Here, in the following, "%" means mass percentage (mass %) unless otherwise specified.

$SiO_2$ is a component for forming glass network structure, and if its content is less than 50%, thermal resistance of glass substrate is deteriorated. On the other hand, if it exceeds 72%, viscosity of the glass at high temperature increases, and it is not possible to decrease the temperatures for various process steps at a time of producing glass substrate. Further, the heat expansion coefficient of glass substrate decreases. The content of $SiO_2$ is more preferably from 52 to 65%, still more preferably from 52 to 62%, the most preferably from 55 to 62%.

$Al_2O_3$ has an effect of increasing glass transition point and improving thermal resistance of glass substrate, but if its content is less than 0.5%, this effect is hardly obtained. On the other hand, if it exceeds 15%, the viscosity of glass substrate at high temperature increases, and it is not possible to decrease temperatures of various process steps in the process for producing glass substrate. The content of $Al_2O_3$ is more preferably from 1 to 15%, still more preferably from 5 to 15%, the most preferably from 5 to 12%.

MgO has an effect of decreasing viscosity of molten glass and to promote melting, and accordingly, it can be contained. However, if its content exceeds 15%, heat expansion coefficient tends to be too high and the glass tends to be devitrified.

CaO has an effect of increasing glass transition point, increasing heat expansion coefficient and decreasing viscosity of glass at high temperature, and accordingly, it can be contained. However, if the content exceeds 12%, the heat expansion coefficient tends to be too high, and the glass tends to be devitrified.

SrO has an effect of increasing glass transition point, increasing heat expansion coefficient and decreasing viscosity of glass at high temperature in the same manner as CaO, and accordingly, it can be contained. However, if the content exceeds 18%, the heat expansion coefficient tends to be too high, and the glass tends to be devitrified.

BaO has an effect of increasing glass transition point and increasing heat expansion coefficient, and accordingly, it can be contained. However, if the content exceeds 18%, the heat expansion coefficient tends to be too high, and the glass tends to be devitrified.

If the total amount of MgC), CaO, SrO and BaO is less than 4%, the viscosity of glass at high temperature tends to be too high. On the other hand, if it exceeds 30%, the heat expansion coefficient becomes too high.

The total amount of MgO, CaO, SrO and BaO is more preferably from 10 to 27%, still more preferably from 10 to 25%, the most preferably from 17 to 25%.

At least one type selected from $Na_2O$, $K_2O$ and $Li_2O$ is essential to increase heat expansion coefficient of glass. If the total amount of them is less than 6%, the heat expansion coefficient of glass becomes too low. On the other hand, if it exceeds 25%, thermal resistance of glass decreases.

The total amount of $Na_2O$, $K_2O$ and $Li_2O$ is more preferably from 6 to 22%, still more preferably from 6 to 20%, the most preferably from 7 to 14%.

Among these, $K_2O$ is contained in an amount of at least 1% to increase heat expansion coefficient of glass. On the other hand, if these components are added excessively, the thermal resistance of glass tends to be significantly decreased. For this reason, the content of $Na_2O$ is more than 0% and at most 10%, the content of $K_2O$ is from 1 to 21%, and the content of $Li_2O$ is from 0 to 1%.

$ZrO_2$ can be contained for the purpose of improving thermal resistance and chemical durability of glass. However, if the content exceeds 10%, the glass tends to be devitrified. The content oE $ZrO_2$ is preferably from 0 to 8%.

The glass substrate for flat panel display of the present invention has, in addition to the feature that the composition satisfies the above requirements, a feature that the average $Fe^{2+}$ content in a surface layer within a depth of 10 μm from a top surface, that is a surface (hereinafter referred to as "surface on which silver electrodes are to be formed") of the glass substrate on a side where silver electrodes are to be formed (accordingly in a state before the silver electrodes are formed) in terms of an amount of $Fe_2O_3$ is at most 0.0725%.

Here, the average $Fe^{2+}$ content in a surface layer within a depth of 10 μm from the top surface, that is, a surface on which silver electrodes are to be formed, can be measured by using absorption photometry with the procedure described in Examples to be described later.

Yellowing of a glass substrate is considered to be caused by a colloid aggregation reaction wherein silver ions ($Ag^+$) contained in a glass at a time of forming (baking) silver electrodes are reduced by e.g. $Fe^{2+}$ or $Sn^{2+}$ present in the glass to form $Ag^0$. The colloid aggregation reaction by $Fe^{2+}$ is shown in formula (1).

$$Fe^{2+}+Ag^+\rightarrow Fe^{3+}+Ag^0 \text{ (metal Ag)} \quad (1)$$

Patent Document 2 describes that by making $Fe_2O_3$ content in a front glass substrate of a plasma display device to be less than 2,000 ppm, the amount of $Fe^{2+}$ contained in the glass substrate is decreased, and the amount of $Fe^{2+}$ reacting in the reaction of formula (1) is decreased, whereby development of brown color formed on a glass substrate surface at a time of forming silver electrodes is prohibited. Accordingly, in the invention described in Patent Document 2, the glass substrate preferably contains no $Fe^{2+}$ except for avoidable impurities contained in the raw material.

However, if no $Fe_2O_3$ is contained in the raw material, or if the $Fe_2O_3$ content in the raw material is too little, melting property of glass in a melting bath decreases, time required for melting glass increases, and productivity of glass substrate decreases. Further, since it is necessary to increase temperature in the melting bath, there occurs such problems that energy efficiency decreases and the lifetime of melting bath decreases. Further, decrease of melting property of glass causes deterioration of homogeneity of molten glass, and further, defects such as unmolten matter of raw material and bubbles tend to remain, and the quality of glass substrate produced decreases.

On the other hand, since $Fe_2O_3$ is a component employed also as color-developing agent, if its content exceeds 0.15%, the glass shows a color, and in order to use the glass for a glass substrate of flat panel display, there occurs such problems that a filter for color tone adjustment becomes necessary, that color tone adjustment by containing other colorants in the glass raw material is required, or that visible light transmittance decreases and the brightness decreases. For this reason, it is necessary that the glass substrate contains $Fe_2O_3$ in an amount of from 0.0725 to 0.15% in terms of the amount of oxide in mass percentage. The content of $Fe_2O_3$ is preferably from 0.075 to 0.13%, more preferably from 0.08 to 0.12%.

Further, in Patent Document 2, the $Fe_2O_3$ amount contained in a glass substrate is defined to be less than 2,000 ppm (0.2%) under assumption that $Fe^{2+}$ is uniformly distributed in the glass substrate, but the amount of $Fe^{2+}$ contained in the glass substrate differs between portions of the glass substrate.

In a case of producing a glass substrate, since a forming method such as float method is conducted in a reducing atmosphere, $Fe^{3+}$ in a surface layer of glass substrate is reduced to $Fe^{2+}$. As a result, in a surface layer of glass substrate, more amount of $Fe^{2+}$ is present than normal ratio of $Fe^{2+}$ based on $Fe_2O_3$. Accordingly, even if the $Fe_2O_3$ amount contained in the glass substrate is less than 2,000 ppm (0.2%), a sufficient amount of $Fe^{2+}$ ions for causing yellowing at a time of forming (baking) silver electrodes are present in the surface layer of glass substrate in some cases, and desired yellowing-inhibiting effect is not always obtained. Moreover, by simply decreasing $Fe_2O_3$ amount to be less than 2,000 ppm (0.2%), the above-mentioned problem of decreasing melting property of glass in a melting bath or a problem that a glass shows a color occur.

On the other hand, in the present invention, the average $Fe^{2+}$ content in a surface layer within a depth of 10 μm from a top surface, that is, a surface on which silver electrodes are to be formed, is made to be less than 0.0725% in terms of $Fe_2O_3$ amount, whereby the amount of $Fe^{2+}$ reacting in the reaction of formula (1) at a time of forming (baking) silver electrodes is inhibited to be sufficiently low level. For this reason, it is possible to effectively inhibit yellowing at the time of forming (baking) silver electrodes.

In the present invention, the average $Fe^{2+}$ content in a surface layer within a depth of 10 μm from a top surface, that is, a surface on which silver electrodes are to be formed in terms of $Fe_2O_3$ amount is preferably at most 0.07%, more preferably at most 0.06%, still more preferably at most 0.055%.

In the present invention, the average $Fe^{2+}$ content in a surface layer within a depth of 10 μm from a top surface, that is, a surface on which silver electrodes are to be formed, may be at most 0.0725% in terms of $Fe_2O_3$ amount, $Fe^{2+}$ content in other portions of glass substrate is not particularly limited. Accordingly, the $Fe^{2+}$ content may be more than 0.0725% in terms of $Fe_2O_3$ amount in a bottom surface side of the glass substrate on which silver electrodes are not formed when the glass substrate is used as a substrate for flat panel display.

Here, the thickness of the glass substrate for flat panel display changes depending on the type of display, and for example, in a case of glass substrate for PDP, the thickness is usually from 0.3 to 3.0 mm, preferably from 0.5 to 2.9 mm, more preferably from 0.7 to 1.9 mm.

In the present invention, the average Redox value (FeO/total iron ($FeO+Fe_2O_3$)) in a surface layer within a depth of 10 μm from a top surface, that is, a surface on which silver electrodes are to be formed, is preferably at most 70%, more preferably at most 68%, still more preferably at most 66%, particularly preferably at most 62%.

Here, the average total ion content and the average $Fe^{2+}$ content in a surface layer within a depth of 10 μm from a top surface, that is, a surface on which silver electrodes are to be formed, can be measured by using absorption photometry with the procedure described in Examples to be described later.

A first embodiment of preferred composition of the glass substrate for flat panel display of the present invention in terms of oxide amount in mass percentage is substantially:

| | |
|---|---|
| $SiO_2$ | 52 to 65%, |
| $Al_2O_3$ | 5 to 15%, |
| MgO | 0 to 4%, |
| CaO | 3 to 12%, |
| SrO | 6 to 9%, |
| BaO | 0 to 13%, |
| MgO + CaO + SrO + BaO | 17 to 27%, |
| $Na_2O + K_2O + Li_2O$ | 6 to 14%, |
| $ZrO_2$ | 0.2 to 6%, |
| $SO_3$ | 0 to 0.6%, and |
| $Fe_2O_3$ | 0.0725 to 0.15%. |

When the glass substrate for flat panel display has the above composition, a glass substrate having a heat expansion coefficient equivalent to that of soda lime glass and having a high glass transition point suitable for producing a large sized PDP, and being suitable for forming by float method, is obtained.

In the above first embodiment of preferred composition, the reason of this definition is as follows.

$SiO_2$ is a component for forming a network structure of glass, and if the content is less than 52%, thermal resistance of glass is deteriorated. On the other hand, if it exceeds 65%, heat expansion coefficient decreases. It is preferably at most 62%. The content of $SiO_2$ is more preferably within a range of from 54 to 60%.

$Al_2O_3$ has an effect of increasing glass transition point and improving thermal resistance, and if the content is less than 5%, this effect is not exhibited, and on the other hand, if it exceeds 15%, the heat expansion coefficient of glass becomes too low. The content is preferably at most 12%. The content of $Al_2O_3$ is more preferably within a range of from 6 to 11%.

MgO increases glass transition point heat expansion coefficient when it is contained in a glass. However, if its content exceeds 4%, devitrification tends to occur.

CaO has a function of increasing glass transition point and increasing heat expansion coefficient. If its content is less than 3%, the heat expansion coefficient of glass becomes too low. On the other hand, if it exceeds 12%, devitrification temperature becomes too high and forming of glass into a glass plate becomes difficult. Its content is preferably at most 5.5%. Particularly, since devitrification temperature becomes higher than molding temperature of float method, forming by the float method becomes difficult.

SrO has a function of increasing glass transition point heat expansion coefficient in the same manner as CaO. If the content is less than 6%, the heat expansion coefficient of glass becomes too low. On the other hand, if the content exceeds 9%, devitrification temperature becomes too high to form a glass into glass plate. Particularly, since the devitrification temperature becomes higher than molding temperature of float method, forming by the float method becomes difficult.

BaO increases glass transition point heat expansion efficient when it is contained in the glass in the same manner as MgO. However, if its content exceeds 13%, devitrification tends to occur.

If the total amount of MgO, CaO, SrO and BaO is less than 17%, thermal resistance of glass decreases, and heat expansion coefficient becomes too low. On the other hand, if it exceeds 27%, devitrification temperature becomes too high. The total amount of these components is more preferably within a range of from 18 to 25%.

At least one type selected from $Li_2O$, $Na_2O$ and $K_2O$ is essential to increase heat expansion coefficient of glass. If the total amount of these components is less than 6%, the heat expansion coefficient of glass becomes too low. The amount is preferably at least 7%. On the other hand, if the total amount exceeds 14%, thermal resistance of glass decreases. The total amount of these components is more preferably within a range of from 8 to 13%.

Among these, at least 4% cf $K_2O$ is preferably contained for increasing heat expansion coefficient of glass. On the other hand, if these components are added excessively, thermal resistance of glass tends to decrease. For these reasons, it is preferred that the content of $Na_2O$ is more than 0% and at most 6%, the content of $K_2O$ is from 4 to 12% and the content of $Li_2O$ is from 0 to 1%. It is more preferred to contain from 3 to 6% of $Na_2O$.

$ZrO_2$ is used for improving thermal resistance and chemical durability of glass. If the content is less than 0.2%, such effects are not exhibited, and at least 0.5% of ZrO is preferably added. On the other hand, if the content exceeds 6%, devitrification temperature of glass becomes too high.

A $SO_3$-containing compound can be used as a refining agent. However, if the amount of refining agent input in the glass raw material is so large that the residual amount in a produced glass for substrate exceeds 0.6% in terms of amount of $SO_3$, glass may be boiled again in the production process and bubbles may remain in the glass. The residual amount is preferably from 0.01 to 0.6% in terms of the amount of $SO_3$, more preferably from 0.01 to 0.6%.

Here, when the $SO_3$-containing compound is used as a refining agent, the amount of $SO_3$ source input into the glass raw material is preferably from 0.1 to 5% in terms of the amount of $SO_3$ based on 100% of raw material.

$Fe_2O_3$ is a component increasing melting property of glass in a melting bath, and it is contained in an amount of from 0.0725 to 0.15%. If the content is less than 0.0725%, the melting property of glass in the melting bath decreases, and the above-mentioned problems occur.

On the other hand, since $Fe_2O_3$ is one employed also as a coloring agent, if its content exceeds 0.15%, the glass shows a color, and in order to use the glass for a glass substrate of flat panel display, there occurs such problems that a filter for color tone adjustment becomes necessary, that another coloring agent needs to be contained in the glass raw material to adjust color tone, or that the visible light transmittance decreases and the brightness decreases.

The content of $Fe_2O_3$ is more preferably from 0.075 to 0.13%, still more preferably from 0.08 to 0.12%.

In the first embodiment of preferred composition of glass substrate for flat panel display of the present invention, an example of more preferred glass composition is substantially as follows in terms of the amount of oxide in mass percentage.

| | |
|---|---|
| $SiO_2$ | 54 to 60%, |
| $Al_2O_3$ | 6 to 11%, |
| MgO | 0 to 4%, |
| CaO | 3 to 5.5%, |
| SrO | 6 to 9%, |
| BaO | 0 to 13%, |
| MgO + CaO + SrO + BaO | 18 to 25%, |
| $Na_2O$ | more than 0% and at most 6%, |
| $Li_2O$ | 0 to 1%, |
| $K_2O$ | 4 to 12%, |
| $Na_2O + K_2O + Li_2O$ | 8 to 13%, |
| $ZrO_2$ | 0.5 to 6%, |
| $SO_3$ | 0 to 0.6%, and |
| $Fe_2O_3$ | 0.075 to 0.13%. |

A second embodiment of preferred composition of the glass substrate for flat panel display of the present invention is substantially as follows in terms of the amount of oxide in mass percentage;

| | |
|---|---|
| $SiO_2$ | 52 to 62%, |
| $Al_2O_3$ | 5 to 15%, |
| MgO | more than 0% and at most 9%, |
| CaO | 3 to 12%, |
| SrO | 9 to 18%, |
| BaO | 0 to 13%, |
| MgO + CaO + SrO + BaO | 25 to 30%, |
| $Na_2O + K_2O + Li_2O$ | 6 to 14%, |
| $ZrO_2$ | 0 to 6%, |
| $SO_3$ | 0 to 1%, and |
| $Fe_2O_3$ | 0.0725 to 0.15%. |

When the composition of glass substrate for flat panel display is within the above range, it becomes possible to decrease viscosity of glass at high temperature while the properties and quality required for a glass for flat panel display substrate, particularly a glass for PDP substrate, are maintained.

In the above second embodiment of preferred composition, the reasons for the limitations are as follows.

$SiO_2$: This a component for forming a network structure of glass, and when the content is less than 52%, thermal resistance of glass for substrate is deteriorated, the viscosity of glass at high temperature increases, and accordingly, the temperatures in the process steps can not be decreased in the process for producing glass for substrate. On the other hand, if the content exceeds 62%, the heat expansion coefficient of glass for substrate decreases. The content of $SiO_2$ is more preferably from 53 to 61%, still more preferably from 54 to 60%, the most preferably from 55 to 59%.

$Al_2O_3$: This component has an effect of increasing glass transition point and improving thermal resistance of glass for substrate, but if the content is less than 5%, this effect is hardly exhibited. On the other hand, if the content exceeds 15%, the viscosity of glass for substrate at high temperature increases, and temperatures in the process steps can not be decreased in the process for producing glass for substrate.

The content of $Al_2O_3$ is more preferably from 6 to 13%. It is still more preferably from 6 to 11%, the most preferably from 6 to 9%.

MgO: This component is contained since it has a function of decreasing viscosity at a time of melting glass and to promote melting. However, if the content exceeds 9%, the thermal expansion coefficient of glass tends to be too high, and the glass tends to be devitrified. It is preferably at most 5%.

The content of MgO is more preferably from 1 to 5%. It is still more preferably from 2 to 5%, the most preferably from 2 to 4%.

CaO: This component has an effect of increasing glass transition point, heat expansion coefficient and decreasing viscosity of glass at high temperature. If the content is less than 3%, the heat expansion coefficient of glass becomes too low. On the other hand, if it is at least 12%, the heat expansion coefficient becomes too high.

The content of CaO is more preferably from 3 to 10%. It is still more preferably from 3 to 8%, the most preferably from 3 to 6%.

SrO: In the same manner as CaO, this component has an effect of increasing glass transition point and heat expansion coefficient and decreasing viscosity of glass at high temperature. If the content is less than 9%, the glass transition point becomes too low. On the other hand, if it exceeds 18%, the heat expansion coefficient of glass becomes too high.

The content of SrO is more preferably from 10 to 17%. It is still more preferably from 10 to 16%, the most preferably from 10 to 15%.

BaO: This component can be contained since it has an effect of increasing glass transition point and heat expansion coefficient and decreasing viscosity of glass at high temperature. However, if its content exceeds 13%, the heat expansion coefficient of glass becomes too high. The content of BaO is more preferably from 1.5 to 6%.

If the total amount of MgC), CaO, SrO and BaO is less than 25%, the viscosity of glass at high temperature becomes too high. On the other hand, if it exceeds 30%, the heat expansion coefficient becomes too high.

The total amount of MgO, CaO, SrO and BaO is preferably from 25 to 29%. It is more preferably from 25 to 28%, still more preferably from 25 to 27%.

$LiO_{2,Na2}O$ and $K_2O$: At least one type of these components is essential to increase heat expansion coefficient of glass. If the total amount of these components is less than 6%, the heat expansion coefficient of glass becomes too low. On the other hand, if the total amount exceeds 14%, thermal resistance of glass decreases.

The total amount of $Li_2O$, $Na_2O$ and $K_2O$ is more preferably from 6 to 12%. It is still more preferably from 6 to 10%, the most preferably from 6 to 8%.

Among these components, $K_2O$ is preferably contained in an amount of at least 1% for increasing heat expansion coefficient. On the other hand, if these components are added excessively, the thermal resistance of glass tends to significantly decrease. For this reason, it is preferred that the content of $Li_2O$ is from 0 to 1%, the content of $Na_2O$ is from 0 to 7%, the content of $K_2O$ is from 1 to 6%, and it is more preferred that the content of $Li_2O$ is from 0 to 1%, the content of $Na_2O$ is from 0 to 6% and the content of $K_2O$ is from 1 to 5%.

$ZrO_2$: This component is used for improving thermal resistance and chemical durability of glass. If the content is more than 6%, the class tends to be devitrified. The content is preferably from 0 to 2%.

$SO_3$: This component is usually used as a refining agent, and a part of it remains in a glass for substrate produced. However, when the amount of $SO_3$ input into a glass raw material is so large that the residual amount in the glass for substrate produced becomes more than 0.6% in terms of the amount of $SO_3$, the glass may be boiled again during the production process and bubbles may remain in the glass. The residual amount in terms of the amount of $SO_3$ is preferably from 0.001 to 0.6%, more preferably from 0.01 to 0.6%.

Here, when $SO_3$ is used as a refining agent, the amount of $SO_3$ source input into a glass raw material, is preferably from 0.1 to 5% in terms of the amount of $SO_3$ based on 100% of raw material.

$Fe_2O_3$ is a component for increasing melting property of glass in a melting bath, and it is contained in an amount of from 0.0725 to 0.15%. If the content is less than 0.0725%, the melting property of glass in the melting bath decreases, and the above-mentioned problem occurs.

On the other hand, since $Fe_2O_3$ is one employed also as a coloring agent, if the content exceeds 0.15%, the glass shows a color, and when the glass is used as a glass substrate of flat panel display, there occurs such problems that a filter for adjusting color tone is required, that another coloring agent needs to be contained in the glass raw material to adjust color tone, or that the visible light transmittance decreases and the brightness decreases.

The content of $Fe_2O_3$ is more preferably from 0.075 to 0.13%, still more preferably from 0.08 to 0.12%.

In the second embodiment of preferred composition of glass substrate for flat panel display of the present invention, more preferred example of glass composition is substantially as follows in terms of the amount of oxides in mass percentage.

| | |
|---|---|
| $SiO_2$ | 55 to 59%, |
| $Al_2O_3$ | 6 to 9%, |
| MgO | 2 to 5%, |
| CaO | 3 to 6%, |
| SrO | 10 to 15%, |
| BaO | 1.5 to 6%, |
| MgO + CaO + SrO + BaO | 25 to 27%, |
| $Na_2O + K_2O + Li_2O$ | 6 to 10%, |
| $ZrO_2$ | 0 to 2%, |
| $SO_3$ | 0.01 to 0.6%, and |
| $Fe_2O_3$ | 0.075 to 0.13%. |

In order to improve melting property, refining property and moldability in the production process, the glass substrate for flat panel display of the present invention may contain $Sb_2O_3$, $P_2O_5$,F, Cl, $NO_2$ and $As_2O_3$ in an amount of at most 2% in terms of their total amount besides the above components.

Further, in order to improve chemical durability of glass, the glass may contain $La_2O_3$,$TiO_2$,$SnO_2$,ZnO and $Y_2O_3$ in an amount of at most 5% in terms of their total amount.

Further, a coloring agent such as CoO, NiO, $Nd_2O_3$, $Cu_2O$, CuO, $MoO_3$,$V_2O_3$ or $Cr_2O_3$ may be added to adjust color tone of glass. The content of these coloring agents is preferably at most 1% in terms of the total amount.

Further, in order to improve melting property in the production process, the glass may contain $B_2O_3$. However, if its content is excessive, the heat expansion coefficient decreases, and accordingly, the content is preferably less than 1.5%.

The glass substrate for flat panel display of the present invention preferably has a color difference b* value determined by the method (560° C.×1 hour baking) described in the Examples to be described later, of at most 7, more preferably at most 6, still more preferably at most 5.

In the process for producing glass substrate for flat panel display of the present invention, likewise conventional processes for producing glass substrate for flat panel display, process steps of float method for producing glass, that are, a melting step, a refining step, a float forming step and gradual cooling step, are carried out. Here, the steps other than the float-forming step are the same as those of conventional process. Namely, in the melting step, the raw materials of components of substrate glass are adjusted so as to prepare a raw material having the target composition, it is continuously input into a melting furnace, and it is heated to obtain a molten glass. As described above, since the glass substrate for flat panel display of the present invention contains a component ($Fe_2O_3$) improving melting property of glass in the melting furnace, the glass is excellent in melting property in the melting step.

Next, in the refining step, a refining agent is added to the molten glass, and the molten glass is maintained at a predetermined Temperature for a predetermined time, whereby bubbles present in the molten glass are floated up to be removed. As the refining agent, $SO_3$ is usually employed, but $As_2O_3$, $Sb_2O_3$, F, Cl, $NO_2$, etc. may also be employed.

Next, in the float-forming step, the molten glass is formed into a glass ribbon having a predetermined thickness by a float method. Here, in the present invention, in the float-forming step, at least one of the following procedures is carried out.

Procedure 1: Hydrogen concentration in a float bath atmosphere is adjusted to at most 3 vol %.

Procedure 2: Glass staying time in the float bath is adjusted to at most 15 minutes.

Heretofore, in order to prevent oxidation of molten tin, inside of a float bath is filled with a mixed gas of hydrogen (usually 4 to 10 vol %) and nitrogen (usually 90 to 96 vol %) to be a reducing atmosphere.

In a case of using a glass substrate formed by the float method as a substrate for flat panel display, usually on a surface of glass ribbon that did not contact molten tin in the float bath, that is on an upper surface, silver electrodes are formed.

Since the upper surface of glass ribbon passing through inside the float bath is exposed to the reducing atmosphere, $Fe^{3+}$ contained in a surface layer of glass ribbon is reduced to $Fe^{2+}$. As a result, in a surface layer of glass substrate produced from the glass ribbon, higher concentration of $Fe^{2+}$ than normal ratio to $Fe_2O_3$ is present.

In the present invention, by conducting the above procedure 1, that is, by adjusting hydrogen concentration in the float bath atmosphere to be at most 3 vol %, it is possible to inhibit reducing of $Fe^{3+}$ contained in a glass ribbon surface layer to be $Fe^{2+}$ when the glass ribbon passes through inside the float bath. By this method, it is possible to reduce average $Fe^{2+}$ content in a surface layer within a depth of 10 μm from a top surface, that is a surface on which silver electrodes are to be formed, of a glass substrate produced from the glass ribbon.

As described above, since the float bath atmosphere is usually a mixed gas of hydrogen and nitrogen, in a case of conducting the above procedure 1, it is preferred to make the nitrogen concentration in the float bath atmosphere to be at least 97 vol %. Here, the hydrogen concentration in the float bath atmosphere of at most 3 vol % may be achieved also by supplying an inert gas such as He or Ar into the float bath atmosphere.

Patent Document 3 describes a process for producing glass substrate for image display device wherein when the amount of $Sn^{2+}$ in the glass substrate exceeds a tolerance, hydrogen concentration is controlled to be decreased to weaken reducing power in the float bath, whereby occurrence of yellowing of glass substrate is inhibited. However, this method is based on an assumption that tin ions ($Sn^{2+}$) derived from molten tin (Sn) present in a float bath form a reduced layer on a float glass substrate, and that this reduced layer causes yellowing of glass substrate, but the document does not at all describe as to influence of $Fe^{2+}$ ions present in a surface layer of glass substrate.

The present inventors have conducted extensive studies as to the relation between ions ($Fe^{2+}$, $Sn^{2+}$, $S^{4+}$, etc.) known to be involved in colloid aggregation reaction of $Ag^+$ ions causing yellowing of glass substrate, and yellowing of glass substrate, and as a result, they have discovered that $Fe^{2+}$ ions present in a surface layer of glass substrate more significantly effects yellowing of glass substrate than tin ions ($Sn^{2+}$) derived from molten tin (Sn) present in a float bath.

Here, in Patent Document 3, since control is made to weaken reducing power in a float bath according to the amount of tin ions ($Sn^{2+}$) being less effective to yellowing of glass substrate than $Fe^{2+}$ ions, function of inhibiting yellowing of glass substrate becomes insufficient, and a procedure for removing surface of glass substrate obtained becomes required. Accordingly, etching of glass substrate surface by immersing it in an etching solution such as hydrofluoric acid solution or sodium hydroxide solution, or polishing of the glass substrate surface by a buff polishing method or sand blast method, is required.

On the other hand, in the above procedure 1, by adjusting hydrogen concentration in a float bath atmosphere to be at most 3 vol %, the amount of $Fe^{2+}$ ions being more effective to yellowing of glass substrate than tin ions ($Sn^{2+}$), can be reduced in a surface layer within a depth of 10 μm from a top surface, that is a surface on which silver electrodes are to be formed, whereby yellowing of glass substrate can be efficiently inhibited, and no procedure of removing a surface of obtained glass substrate is required.

In the above procedure 1, hydrogen concentration in the float bath is more preferably at most 2.5 vol %, more preferably at most 2 vol %, still more preferably at most 1.5 vol %. Here, for the purpose of preventing oxidation of molten tin, it is necessary to maintain reducing atmosphere in the float bath, and for this reason, the hydrogen concentration in the float bath is preferably at least 0.1 vol %, more preferably at least 0.5 vol %, particularly preferably at least 1 vol %.

Further, in the present invention, by conducting the above procedure 2, that is, by adjusting the staying time of glass (glass ribbon) in the float bath to be at most 15 minutes, it is possible to inhibit reducing of $Fe^{3+}$ contained in a surface layer cf glass ribbon to be $Fe^{2+}$ when the glass ribbon passes through inside the floating bath. By this method, it is possible to decrease average $Fe^{2+}$ content in a surface layer within a depth of 10 μm from a top surface, that is a surface on which silver electrodes are to be formed, cf a glass substrate produced from the glass ribbon.

In the above procedure 2, the staying time of glass in the float bath is more preferably at most 13 minutes, still more preferably at most 11 minutes, particularly preferably at most 9 minutes. However, if the staying time of glass in the float bath is insufficient, it is difficult to form a glass into a glass ribbon having a desired thickness and properties (e.g. compaction, flatness, etc.) . For this reason, the staying time of glass in the float bath is more preferably at least 5 minutes.

In any of a case of conducting the above procedure 1 and a case of conducting the above procedure 2, the temperature of glass ribbon passing through the float bath is preferably from 930 to 1,300° C. in a high temperature region in the upstream side of float bath, and it is preferably from 800 to 930° C. in a forming region subsequent to the high temperature region, for forming the glass ribbon into a predetermined thickness and width.

In order to inhibit reducing of $Fe^{3+}$ contained in a surface layer of glass ribbon to be $Fe^{2+}$ when the glass ribbon passes through inside the floating bath, it is preferred to conduct both of the above procedures 1 and 2.

A glass ribbon pulled out from the float bath is gradually cooled to the vicinity of room temperature within a time of 20 minutes in the gradual cooling step, and cut into a desired size to obtain a glass substrate for flat panel display of the present invention.

The glass substrate for flat panel display of the present invention is suitable for, among flat panel displays, one having a glass substrate surface on which silver electrodes are formed, and is particularly suitable as a glass substrate for PDP, particularly to a front glass plate for PDP.

The present invention also provides a PDP employing the above glass substrate for flat panel display.

In the PDP of the present invention, the construction other than the front glass is not particularly limited, and it is appropriately selected from known constructions of PDP.

EXAMPLES

In the following, the present invention will be described with reference to Examples, but the present invention is not limited to these Examples.

Table 1 shows glass compositions of Examples 1 to 4.

Raw materials of components adjusted to prepare a raw material having a target composition, and it was put into a melting furnace, it was heated at a temperature of from 1,400 to 1,700° C. for a predetermined time to be melted, and a molten glass thus produced was formed by a float method into a glass ribbon having a predetermined thickness. Here, hydrogen concentration in a float bath atmosphere and glass staying time in the float bath are as shown in Table 1. Further, the temperature of glass ribbon passing through inside the float bath was 930 to 1,300° C. in a high temperature region, and 800 to 930° C. in a forming region. The glass ribbon was gradually cooled, and thereafter, both surfaces of the glass ribbon were cleaned. With respect to a glass thus obtained, average total ion content, average $Fe^{2+}$ content and average Redox value in a surface layer within a depth of 10 μm from a top surface were measured by the following procedure by using a light-absorption light intensity method. Table 1 shows the result. Here, in Table 1, Examples 1 and 2 are Examples of the present invention and Examples 3 and 4 are Comparative Examples.

Method for Measuring Average $Fe^{2+}$ Content in Surface Layer

Glass surface is etched by a mixture of hydrofluoric acid and hydrochloric acid. A suitable portion of the etching solution is put into a plastic container, and 2,2'-dipyridyl solution and ammonium acetate buffer solution are quickly added to the etching solution to make only $Fe^{2+}$ develop color. The color-developed solution is diluted to predetermined volume by ion-exchanged water. Next, another suitable portion of the etching solution is put into another plastic container, and hydroxylamine hydrochloric acid solution is added to reduce all iron to $Fe^{2+}$. Then 2,2'-dipyridyl solution and ammonium acetate buffer solution are added to the etching solution to develop color. The color-developed solution is diluted to predetermined volume by ion-exchanged water.

A standard solution of $Fe^{3+}$ is made develop color in the same manner by using hydroxylamine hydrochloric acid solution, 2,2'-dipyridyl solution and ammonium acetate buffer solution. With respect to this color-developed standard solutions, absorbance at 522 nm is measured to make a calibration curve. Absorbance of color-developed sample solution is measured, and a concentration is calculated by using the calibration curve. From the measured concentration and the etching amount of glass, $Fe^{2+}$ content and a total Fe content in the glass surface are calculated.

Measurement of b* Value

The glass surface obtained above was coated with a silver paste, its temperature was raised at 200° C./hr to 560° C., it was baked at the temperature for 1 hour or 10 hours, the temperature was lowered at 60° C./hr to a room temperature, and a visible light transmittance was measured. As an index of yellowing of a surface under silver paste and its vicinity, a color difference b* value of L*a*b* color coordinate system of C light source was determined from the visible light transmittance value by using the method according to JIS-Z8729, and is shown in Table 1.

TABLE 1

| | Ex. 1 | Ex. 2 | Ex. 3 | Ex. 4 |
|---|---|---|---|---|
| $SiO_2$ (wt %) | 58.4 | 58.42 | 58.49 | 58.46 |
| $Al_2O_3$ (wt %) | 6.75 | 6.75 | 6.91 | 6.70 |
| MgO (wt %) | 1.84 | 1.83 | 1.85 | 1.85 |
| CaO (wt %) | 4.85 | 4.82 | 4.83 | 4.83 |
| SrO (wt %) | 6.93 | 6.94 | 6.91 | 6.91 |
| BaO (wt %) | 8.01 | 8.03 | 8.01 | 8.03 |
| $Na_2O$ (wt %) | 3.99 | 4.00 | 4.00 | 4.00 |

TABLE 1-continued

| | Ex. 1 | Ex. 2 | Ex. 3 | Ex. 4 |
|---|---|---|---|---|
| $K_2O$ (wt %) | 6.27 | 6.28 | 6.28 | 6.28 |
| $ZrO_2$ (wt %) | 2.74 | 2.74 | 2.74 | 2.74 |
| $Fe_2O_3$ (wt %) | 0.088 | 0.109 | 0.107 | 0.106 |
| Thickness of glass ribbon (mm) | 1.8 | 2.8 | 1.8 | 2.8 |
| Glass staying time in float bath (min) | 8 | 12 | 8 | 12 |
| Hydrogen concentration (%) | 1 | 1 | 10 | 10 |
| Temperature of glass ribbon (high temperature region, ° C.) | 930-1,300 | 930-1,300 | 930-1,300 | 930-1,300 |
| Temperature of glass ribbon (low temperature region, ° C.) | 800-930 | 800-930 | 800-930 | 800-930 |
| b* (560° C. × 1 hr bake) | 3.6 | 6.5 | 8.3 | 9.2 |
| b* (560° C. × 10 hrs bake) | 10 | 17.6 | 24.9 | 35.6 |
| Average total Fe content (wt %) | 0.0867 | 0.1063 | 0.0970 | 0.1006 |
| Average $Fe^{2+}$ content (wt %) | 0.053 | 0.0722 | 0.0874 | 0.0928 |
| Average Redox value (%) | 61 | 68 | 90 | 92 |

INDUSTRIAL APPLICABILITY

The glass substrate for flat panel display of the present invention is suitable for flat panel displays, particularly, for one wherein silver electrodes are formed on a glass substrate surface, and the glass substrate is useful in industry as a glass substrate for PDP, particularly as a front glass plate of PDP.

The entire disclosure of Japanese Patent Application No. 2006-305637 filed on Nov. 10, 2006 including specification, claims and summary is incorporated herein by reference in its entirety.

The invention claimed is:

1. A glass substrate for flat panel display, which is formed by a float method, which has a composition consisting essentially of, in terms of oxide amount in mass %:

| | |
|---|---|
| $SiO_2$ | 50 to 72%, |
| $Al_2O_3$ | 0.5 to 15%, |
| MgO + CaO + SrO + BaO | 4 to 30%, |
| $Na_2O$ | more than 0% and at most 10%, |
| $K_2O$ | 1 to 21%, |
| $Li_2O$ | 0 to 1%, |
| $Na_2O + K_2O + Li_2O$ | 6 to 25%, |
| $ZrO_2$ | 0 to 10%, and |
| $Fe_2O_3$ | 0.0725 to 0.15%; and |

wherein the average $Fe^{2+}$ content in a surface layer of the glass substrate within a depth of 10 μm from a top surface is at most 0.0725% in terms of $Fe_2O_3$ amount.

2. A process for producing glass substrate for flat panel display, which is a process for producing the glass substrate for flat panel display as defined in claim 1, comprising forming the glass substrate on a float bath wherein a hydrogen concentration in a float bath atmosphere is at most 3 vol %.

3. The process for producing glass substrate for flat panel display, which is a process for producing the glass substrate for flat panel display as defined in claim 1, comprising forming the glass substrate on a float bath wherein a glass-staying time in the float bath is at most 15 minutes.

4. A process for producing glass substrate for flat panel display, which is a process for producing a glass substrate for flat panel display as defined in claim 1, comprising forming the glass substrate on a float bath wherein a hydrogen concentration in a float bath atmosphere is at most 3 vol %, and a glass-staying time in the float bath is at most 15 minutes.

5. A flat panel display employing the glass substrate for flat panel display as defined in claim 1.

* * * * *